(12) United States Patent
Stuart et al.

(10) Patent No.: US 10,824,983 B1
(45) Date of Patent: Nov. 3, 2020

(54) SYSTEMS AND METHODS FOR TRACKING-BASED TRANSACTIONS

(71) Applicant: Wells Fargo Bank, N.A., San Francisco, CA (US)

(72) Inventors: Craig Stuart, San Francisco, CA (US); Michelle Young, San Francisco, CA (US); Kenneth L. Wright, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 860 days.

(21) Appl. No.: 14/975,003

(22) Filed: Dec. 18, 2015

(51) Int. Cl.
    *G06Q 10/08* (2012.01)
    *G06Q 20/40* (2012.01)
    *G06Q 40/08* (2012.01)

(52) U.S. Cl.
    CPC ....... *G06Q 10/0833* (2013.01); *G06Q 20/405* (2013.01); *G06Q 40/08* (2013.01)

(58) Field of Classification Search
    USPC .......................................................... 705/4
    See application file for complete search history.

(56) References Cited

U.S. PATENT DOCUMENTS

| | | |
|---|---|---|
| 5,644,727 A | 7/1997 | Atkins |
| 5,852,811 A | 12/1998 | Atkins |
| 5,875,437 A | 2/1999 | Atkins |
| 6,108,641 A | 8/2000 | Kenna et al. |
| 6,606,606 B2 | 8/2003 | Starr |
| 7,536,350 B1 | 5/2009 | Bent et al. |
| 8,204,809 B1 | 6/2012 | Wise |
| 8,682,802 B1 | 3/2014 | Kannanari |
| 2002/0095386 A1 | 7/2002 | Maritzen et al. |
| 2002/0128912 A1 | 9/2002 | Vindeby |
| 2004/0073688 A1 | 4/2004 | Sampson |
| 2006/0064378 A1 | 3/2006 | Clementz et al. |

(Continued)

OTHER PUBLICATIONS

Inaba, Tatsuya. "Impact Analysis of RFID on Financial Supply Chain Management" IEEE, 2007 IEEE Conference on Service Operations and Logistics, and Informatics (pp. 1-6). Provided as attached. ISBN: 978-1-4244-1117-7. DOI: 10.1109/SOLI.2007.4383927 (Year: 2007).*

(Continued)

*Primary Examiner* — Lindsay M Maguire
*Assistant Examiner* — Ambreen A. Alladin
(74) *Attorney, Agent, or Firm* — Foley & Lardner LLP

(57) ABSTRACT

Methods and systems of completing tracking-based transactions are disclosed. A financial institution computing system includes a customer database retrievably storing information relating to a plurality of financial accounts, a tag database retrievably storing information relating to a plurality of tags, a network interface circuit, and a transaction circuit. The transaction circuit receives a transaction request with at least one tag relating to an order of goods from a seller computing system. A transaction schedule is generated based on the transaction request and customer information in the customer database, and is stored in the tag database. The transaction circuit receives tag data corresponding to physical movement of the order of goods and performs at least one transaction pursuant to the transaction schedule based on received tag data.

21 Claims, 4 Drawing Sheets

(56) References Cited

U.S. PATENT DOCUMENTS

| | | |
|---|---|---|
| 2007/0174189 A1 | 7/2007 | Bishop et al. |
| 2007/0192216 A1* | 8/2007 | Arnold .................. G06Q 30/06 705/28 |
| 2007/0198406 A1 | 8/2007 | Bishop et al. |
| 2008/0140562 A1 | 6/2008 | Kerdachi |
| 2009/0076956 A1 | 3/2009 | Bishop et al. |
| 2009/0076957 A1 | 3/2009 | Bishop et al. |
| 2009/0083181 A1 | 3/2009 | Bishop et al. |
| 2009/0157518 A1 | 6/2009 | Bishop et al. |
| 2009/0187482 A1* | 7/2009 | Blount ............... G06Q 30/0207 705/14.1 |
| 2010/0169236 A1 | 7/2010 | Bregstein et al. |
| 2010/0241545 A1 | 9/2010 | O'Connor et al. |
| 2011/0010289 A1 | 1/2011 | Kranzley |
| 2011/0289006 A1 | 11/2011 | Hutchison et al. |
| 2012/0271770 A1 | 10/2012 | Harris et al. |
| 2012/0303498 A1* | 11/2012 | Cova .................. G06Q 10/0833 705/34 |
| 2013/0290187 A1 | 10/2013 | Itwaru |
| 2014/0207668 A1 | 7/2014 | Hermansen et al. |
| 2014/0229375 A1 | 8/2014 | Zaytsev et al. |
| 2014/0279475 A1 | 9/2014 | Castrechini et al. |
| 2014/0379562 A1 | 12/2014 | Olson et al. |
| 2015/0113609 A1 | 4/2015 | Joyce et al. |
| 2015/0120546 A1 | 4/2015 | Fernandes |
| 2015/0149352 A1* | 5/2015 | Nichols .............. G07C 9/00309 705/40 |
| 2016/0330027 A1 | 11/2016 | Ebrahimi |
| 2016/0335633 A1 | 11/2016 | Joyce et al. |
| 2017/0109715 A1 | 4/2017 | Aguirre et al. |
| 2017/0132615 A1 | 5/2017 | Castinado et al. |
| 2017/0132630 A1 | 5/2017 | Castinado et al. |
| 2017/0147975 A1 | 5/2017 | Natarajan et al. |

OTHER PUBLICATIONS

Amazon Payments FAQ, Amazon, retrieved from: http://www.amazon.com/gp/help/customer/display.html/ref=xm_1161282_cont_home?nodeId=1161282 (retrieved Apr. 28, 2017).

Crowe et al., Is Payment Tokenization Ready for Primetime?, Jun. 11, 2015, Federal Reserve Bank of Atlanta & Federal Reserve Bank of Boston, 51 pages.

Yeung, K., Banking startup Clearbanc launches with a new instant pay tool for Uber drivers, VentureBeat, Business, retrieved from: http://www.venturebeat.com/2015/10/15/banking-startup-clearbanc-launches-with-a-new-instant-pay-tool-for-uber-drivers, 5 pages (Oct. 15, 2015).

* cited by examiner

SYSTEMS AND METHODS FOR TRACKING-BASED TRANSACTIONS

BACKGROUND

Timing of payment transactions between a buyer and a seller are often limited to a single condition, such as a shipment from a seller location or a receipt of goods at a buyer location. For example, in the context of transactions between two businesses, a transaction may involve a large dollar value sale of goods involving terms such as free on board ("FOB") shipping point. In such a transaction, ownership and liability of the goods shifts from the buyer to the seller once the goods depart from the shipping point of the seller. As a practical matter, however, the buyer may not be aware of the actual time and date of the shift of ownership and liability (e.g., where the buyer is not present at the shipping point or does not have control over the shipping arrangement). Instead, the buyer may only become aware of the progress of the goods once the goods arrive at the shipping destination (e.g., at the place of business of the buyer), at which point the buyer may complete a payment transaction to the seller. As such, there is often a disconnect between a time at which ownership of goods shifts, and a time at which a payment is made.

SUMMARY

One embodiment relates to a financial institution computing system. The system includes a customer database retrievably storing information relating to a plurality of financial accounts, a tag database retrievably storing information relating to a plurality of tags, a network interface circuit structured to allow the financial institution computing system to exchange information over a network, and a transaction circuit including at least one processor and an associated memory. The transaction circuit is structured to receive a transaction request relating to an order of goods and at least one tag from a seller computing system over the network. The transaction circuit is further structured to generate a transaction schedule based on the transaction request and customer information in the customer database, and store information relating to the transaction request, the at least one tag, and the transaction schedule in the tag database. The transaction circuit is structured to receive tag data corresponding to physical movement of some or all goods of the order of goods over the network, and perform at least one transaction pursuant to the transaction schedule based on the tag data.

Another embodiment relates to a method of completing order tracking-based transactions. The method includes receiving, by a transaction circuit of a financial institution computing system over a network through a network interface circuit, a transaction request relating to an order of goods and at least one tag from a seller computing system. The method further includes generating, by the transaction circuit, a transaction schedule based on the transaction request and customer information in a customer database at the financial institution computing system, and storing information relating to the transaction request, the at least one tag, and the transaction schedule in a tag database at the financial institution computing system. The method includes receiving, by the transaction circuit, tag data over the network corresponding to physical movement of some or all goods of the order of goods, and performing at least one transaction pursuant to the transaction schedule based on the tag data.

Yet another embodiment relates to a non-transitory computer readable media having computer-executable instructions embodied therein that, when executed by a transaction circuit of a financial institution computing system, causes the financial institution computing system to perform operations to complete order tracking-based transactions. The operations include receiving a transaction request relating to an order of goods and at least one tag from a seller computing system over a network through a network interface circuit. The operations further include generating a transaction schedule based on the transaction request and customer information in a customer database at the financial institution computing system, and store information relating to the transaction request, the at least one tag, and the transaction schedule in a tag database at the financial institution computing system. The operations include receiving tag data relating to physical movement of some or all goods of the order of goods over the network and perform at least one transaction pursuant to the transaction schedule based on the tag data.

And yet another embodiment relates to a financial institution computing system. The system includes a customer database retrievably storing information relating to a plurality of financial accounts including at least a financial account of a seller and a financial account of a buyer, a tag database retrievably storing information relating to a plurality of tags associated with a plurality of orders, a network interface circuit structured to allow the financial institution computing system to exchange information over a network, and a transaction circuit including at least one processor and an associated memory. The transaction circuit is structured to provide a user interface for each of the seller and the buyer that is accessible over the network, wherein the user interface allows each of a seller computing system and a buyer computing system to define terms for a transaction request and a corresponding transaction schedule relating to an order of goods and at least one tag. The transaction circuit is further structured to approve the transaction request and the transaction schedule based on customer information relating to each of the seller and the buyer in the customer database, and store information relating to the transaction request, the transaction schedule, and the at least one tag in the tag database. The transaction circuit is structured to receive tag data corresponding to physical movement of the order of goods and update the user interface to allow each of the seller and the buyer to view information relating to the location of the order of goods and perform at least one transaction pursuant to the transaction schedule based on received tag data. The transaction circuit is further structured to receive tag data indicating that the order of goods has arrived at the buyer and perform a final payment transaction from the financial account of the buyer to the financial account of the seller.

DETAILED DESCRIPTION

Embodiments of systems and methods of completing tracking-based transactions are discussed below. Tracking-based transactions may be managed and performed by financial institutions to allow for increased payment, credit, and insurance options for purchases between buyers and sellers. In accordance with the following embodiments, transactions may be tailored to the overall progress of a given product order, for example based on production progress, shipment location, or combinations thereof. For example, payments may be applied, credit may be extended, and insurance may be adjusted and managed in an incremental manner as a given shipment approaches its destination.

Figure 1:
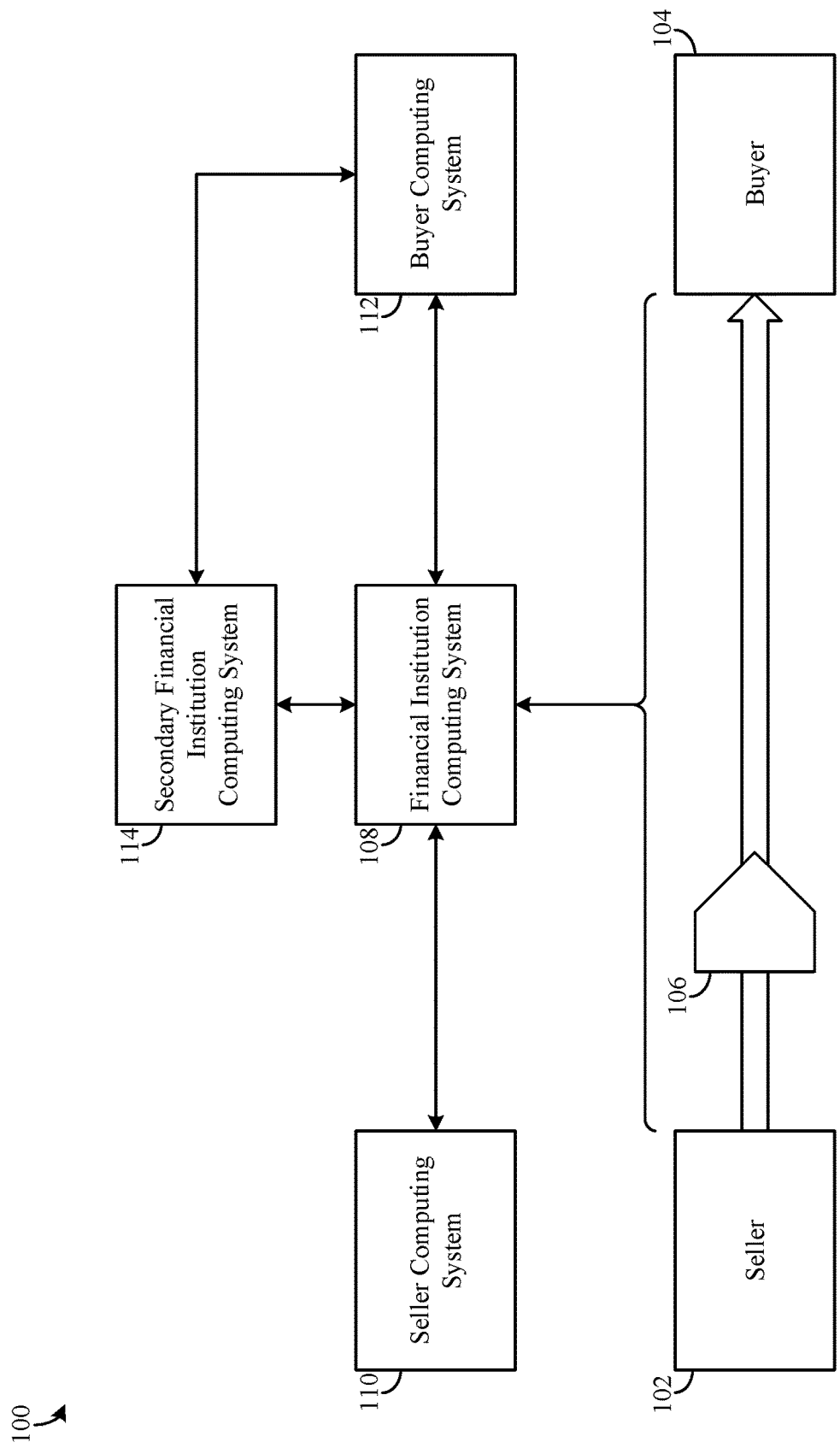
FIG. 1 is a block diagram illustrating a tracking-based transaction system, according to an example embodiment.

Referring to FIG. 1, a tracking-based transaction system 100 includes a seller 102, a buyer 104, an order 106, a financial institution computing system 108, a seller computing system 110, and a buyer computing system 112. The seller 102 is a merchant of goods, and may include any or all related entities, facilities, products, employees, agents, and so on involved in the preparation and shipment of goods. The seller 102 is associated with the seller computing system 110, which includes one or more computing systems structured to exchange data with other components of the tracking-based transaction system 100. In some arrangements, components of the tracking-based transaction system 100 exchange information over a network. The buyer 104 is one or more individuals or entities purchasing the order 106 from the seller 102. In turn, the buyer 104 is associated with a buyer computing system 112, which in various arrangements is structured in a manner similar to the seller computing system 110. The order 106 includes one or more shipments of goods ordered by the buyer 104 and provided by the seller 102.

The financial institution computing system 108 is a computing system at a financial institution that is capable of performing various financial transactions as well as maintaining customer accounts and databases of customer information. In the context of the present disclosure, the financial institution can include commercial or private banks, credit unions, investment brokerages, and so on. The financial institution computing system 108 is structured to use information relating to the order 106 to perform various financial transactions involving one or both of the seller 102 and the buyer 104.

In one arrangement, the financial institution computing system 108 is structured to perform payment transactions from the buyer 104 to the seller 102 based on the progress of the order 106 under a transaction schedule. In one such an arrangement, both the seller 102 and the buyer 104 are customers of and maintain one or more financial accounts with the financial institution associated with the financial institution computing system 108. In another such arrangement, the seller 102 is a customer of the financial institution associated with the financial institution computing system 108 and the buyer 104 is a customer of a secondary financial institution computing system 114 (e.g., similar to the financial institution computing system 108, but associated with another financial institution). The financial institution computing system 108 may perform incremental transactions as the order 106 is assembled and/or shipped and makes its way to the buyer 104. For example, the financial institution computing system 108 may follow a transaction schedule where payments of 10% increments of a sale price are performed for every 10% of shipping distance covered as the order 106 approaches the buyer 104. As another example, the financial institution computing system 108 may follow a transaction schedule where a first payment of 25% of a sale price is performed upon receiving an invoice from the seller computing system 110, a second 25% payment is performed once the order 106 is produced, a third 25% payment is performed once the order 106 is shipped, and a fourth and final 25% payment is performed once the buyer 104 receives the order 106.

In another arrangement, the financial institution computing system 108 is structured to generate and follow a transaction schedule where incremental credit increases are provided to the seller 102 corresponding to the progress of the order 106. For example, the seller 102 may apply for a business line of credit with the financial institution computing system 108 via the seller computing system 110. The seller 102 may include information relating to forthcoming income streams in a credit application, which may include a recent invoice for the order 106. In one such an arrangement, the financial institution computing system 108 grants the seller 102 a $100,000 line of credit based on the order 106. Further, the financial institution computing system 108 may be structured to extend credit to the seller 102 in $20,000 increments, beginning on the shipment date of the order 106, with additional $20,000 increments being extended based on the shipping location of the order 106. As such, the seller 102 may initially be extended $20,000 in credit when the order 106 ships, with three $20,000 increases as the order 106 approaches the buyer 104, and a final $20,000 increase (i.e., to a total of $100,000) after the buyer 104 receives the order 106. In some arrangements, each of the three $20,000 increases over the course of shipment may be based on a percent distance traveled toward the buyer (e.g., one $20,000 increase for every 33% of the total shipping distance traveled). In other arrangements, each of the three $20,000 increases over the course of shipment may be based on identified milestones. Milestones may include specific locations (e.g., based on distance, risk of loss due to poor or hostile conditions in particular areas, identified shipping centers, etc.). In all such arrangements, the seller 102 may receive payment for the order 106 from the buyer 104, which may then be used towards the $100,000 line of credit.

In yet another arrangement, the financial institution computing system 108 may be structured to underwrite and adjustably provide insurance for the order 106 as the order 106 makes its way to the buyer 104 under another transaction schedule. In some arrangements, the order 106 involves a production process spanning multiple locations and involving multiple shipments. For example, a first facility of the seller 102 may ship raw materials to a second facility for processing. The second facility may ship the processed materials to a third facility for preliminary assembly and so on, ultimately resulting in the final products comprising the order 106 that is provided to the buyer 104. Throughout the production process, materials and/or products making up the order 106 may change in value. For example, raw materials used in the order 106 may be low in value, but the final products shipped to the buyer 104 may be comparatively high in value. As such, the financial institution computing system 108 may use information relating to the progress of the order 106 along the production process, to provide periodically adjusted insurance coverage to the seller 102 or the buyer 104.

In some arrangements, the financial institution computing system 108 is structured to provide a user interface for both the seller 102 and the buyer 104. In such arrangements, the seller 102 (e.g., via the seller computing system 110) and the buyer 104 (e.g., via the buyer computing system 112) may register with and provide login credentials to (e.g., a username and password) the financial institution computing system in order to access the user interface. In addition to granting access to the user interface, registration and entry of login credentials may also serve as authentication and authorization information sufficient to bind the seller 102 and the buyer 104 to transactions created and agreed to in the user interface. The user interface may allow the seller 110 to provide information relating to the order 106 (e.g., an invoice, or information relating to or contained therein) to the financial institution computing system 108, and select one or more desired transactions relating to the order 106 (e.g., a line of credit, a cash advance, insurance coverage, payment transactions, etc.). In some arrangements, the buyer 104 may view and approve, reject, add, or modify the one or more transactions or terms related thereto that are requested by the seller 102. For example, where the requested transaction includes incremental payments from the buyer 104 to the seller 102, the buyer 104 can propose adjusted payment terms (e.g., change the number, frequency, and/or amount of payments, along with payment triggering events, etc.). If the seller 102 and the buyer 104 are able to reach an agreement as to the transaction terms, the resulting transaction request and transaction schedule may be reviewed, approved, rejected, or adjusted by the financial institution computing system 108, for example based on financial information relating to the seller 102 and/or the buyer 104 maintained at the financial institution computing system 108 (e.g., transaction histories, credit ratings, etc.).

As one of skill in the relevant art would recognize, the above arrangements are but a handful of many possible implementations of the systems and methods discussed herein. For example, the financial institution computing system 108 may provide transaction services with various different terms than those discussed above. In addition, the financial institution computing system 108 may provide combinations of the above transactions, for example incremental insurance adjustments and credit extensions. Other arrangements within the scope of this disclosure are possible.

Figure 2A:
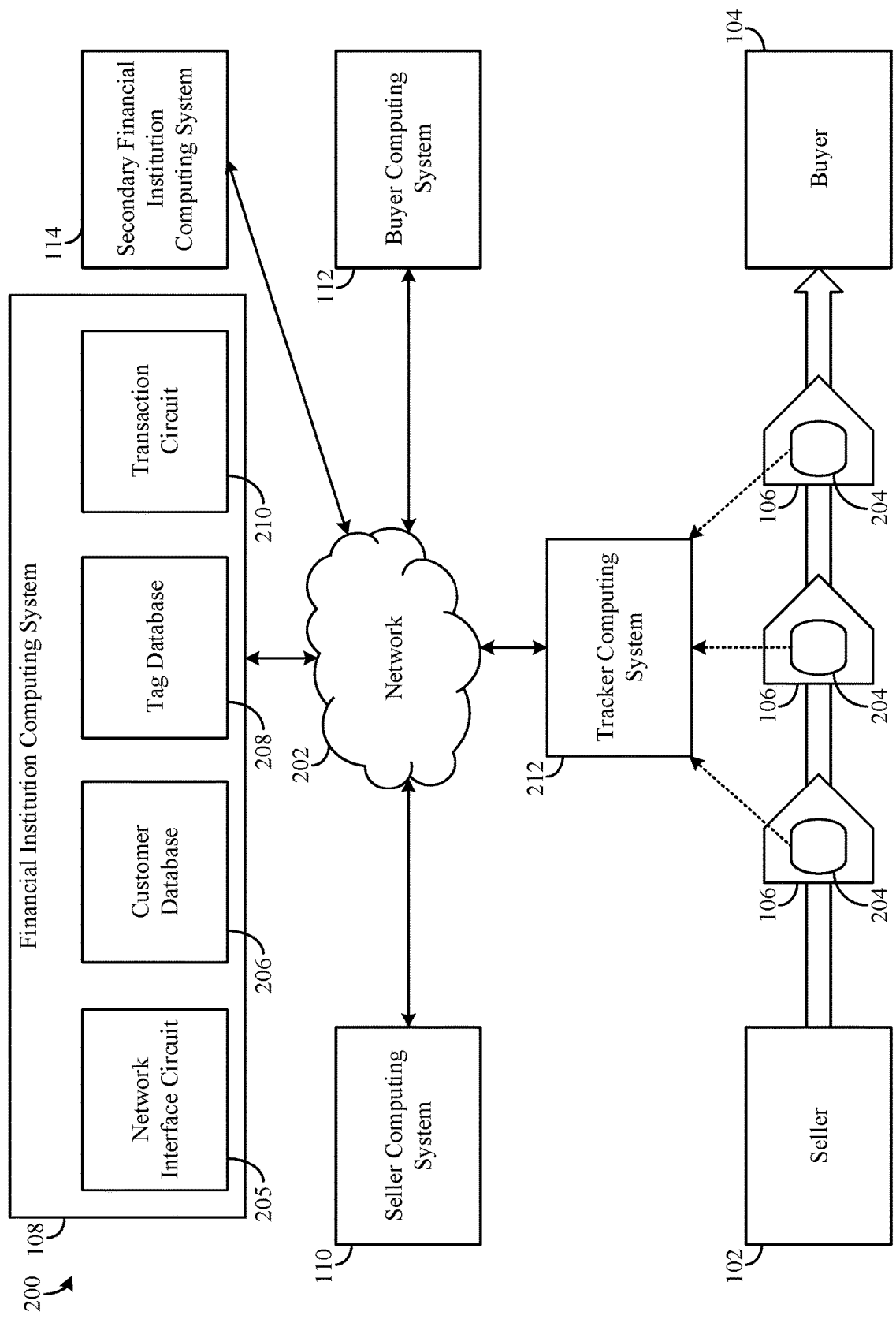
FIGS. 2A and 2B are block diagrams illustrating two implementations of the tracking-based transaction system shown in FIG. 1.

Referring to FIG. 2A, a location-based transaction system 200 is shown according to an example embodiment. The location-based transaction system 200 is a more detailed arrangement of the tracking-based transaction system 100, and similarly includes the seller 102, the buyer 104, the order 106, the financial institution computing system 108, the seller computing system 110, and the buyer computing system 112. A network 202 enables components of the location-based tracking system 200 to communicate with each other. The network 202 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 202 includes the internet.

The location-based transaction system 200 also includes a tracker computing system 212. The tracker computing system 212 includes one or more computing systems structured to monitor and track the location of a tag 204. In some arrangements, the tracker computing system 212 is associated with a third party separate from the financial institution computing system 108 (e.g., associated with one or more carriers, sellers, or related third parties). In other arrangements, the tracker computing system 212 includes functionalities implemented in the financial institution computing system 108 itself.

In various arrangements, the tag 204 is a code (e.g., a serial number, bar code, QR code, etc.) or computing system structured to specifically identify and locate the order 106. The tag 204 may be coupled to products of the order 106 themselves, external packaging or shipping containers containing the order 106, etc. In one arrangement, the tag 204 is a global positioning system ("GPS") transceiver capable of providing location data to the tracker computing system 212 via a network, such as the Internet. As such, the tracker computing system 212 may be able to communicate with the tag 204 to retrieve information relating to the location of the tag 204 and therefore the order 106 at a given time. In another arrangement, the tag 204 is a code specific to the order 106 that may be read and maintained by carriers of a given shipment. As such, the tracker computing system 212 may be able to communicate with individual carriers (e.g., computing systems associated with shipping trucks, trains, airplanes, ships, etc.) to determine tags on board (e.g., the tag 204 corresponding to the order 106), and the location of a given carrier at a given time. In some such arrangements, carriers themselves may be equipped with GPS-enabled devices, or may be otherwise able to provide tag and location information to the tracker computing system 212 (e.g., over the network 202) at a given time.

The financial institution computing system 108 includes network interface circuit 205, a customer database 206, a tag database 208, and a transaction circuit 210. The network interface circuit 205 allows the financial institution computing system 108 to exchange information over the network 202.

The customer database 206 allows the financial institution computing system 108 to retrievably store customer information relating to the various operations discussed herein, and may include non-transient data storage mediums (e.g., local disc or flash-based hard drives, local network servers, and the like) or remote data storage facilities (e.g., cloud servers). The customer database 206 includes personal customer information (e.g., names, addresses, phone numbers, and so on), identification information (e.g., driver's license numbers, biometric data, and so on), and customer financial information (e.g., account numbers, account balances, available credit, credit history, transaction histories, and so on). The tag database 208 is also a storage medium, which includes information relating to tags (e.g., the tag 204).

The transaction circuit 210 is structured to enable various tracking-based transactions at the financial institution computing system 108. As used herein, the term "circuit" may include hardware structured to execute the functions as described. In some embodiments, each respective "circuit" may include software for configuring the hardware to execute the functions described herein. The circuit may be embodied as one or more circuitry components including, but not limited to, processing circuitry, storage media, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuit, hybrid circuit, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to a memory. In this regard, the one or more processors may execute instructions stored in memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus.

Each memory device discussed herein may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Each respective memory may be operable to maintain or otherwise store information relating to the operations performed by one or more associated circuits, including processor instructions and related data (e.g., database components, object code components, script components, etc.), in accordance with the example embodiments described herein.

Based on the operations described herein with respect to each circuit, a given circuit may further be communicatively coupled to one or more other components, for example other circuits, input devices (e.g., devices providing incoming data to be processed by the circuit), output devices (e.g., devices receiving and acting upon data processed by the circuit), or intermediary devices (e.g., routing data to or from other components). In addition, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

With respect to the transaction circuit 210, the transaction circuit 210 may be structured to perform payment transactions, underwrite and extend lines of credit, and underwrite and provide insurance to customers of the financial institution. In some arrangements, the transaction circuit 210 cooperates with the tracker computing system 212 to perform tracking-based transactions, based on the location of the tag 204. Further, in some arrangements, the transaction circuit 210 is structured to provide the user interface for the seller 102 and the buyer 104 as discussed with respect to FIG. 1, above.

In operation, the buyer 104 may use the buyer computing system 112 to request the order 106 from the seller 102 over the network 202. The information may be received at the seller computing system 110, which may generate and transmit an invoice to the buyer computing system 112. In some arrangements, the invoice contains the information and terms relating to the order 106, such as product descriptions, quantities, price, and payment conditions (e.g., full invoice amount upon delivery at buyer facility). Further, in some arrangements, the invoice includes information relating to the tag 204. For example, where the tag 204 is a code, the code may be included in the invoice. Where the tag 204 is a GPS-enabled computing system, the invoice may include information specifically identifying the tag 204 (e.g., a serial number).

The financial institution computing system 108 may perform any of a variety of transactions using the tag 204. For example, in some arrangements, the seller 102 may apply for a line of credit with the financial institution computing system 108 over the network 202 via the seller computing system 110. The transaction circuit 210 may receive a seller credit application from the network 202, and where the seller 102 is a customer of the financial institution, the transaction circuit 210 may use information relating to the seller 102 from the customer database 206 to underwrite the credit application. The seller credit application may include information relating to forthcoming income streams, such as information in the invoice for the order 106, or the invoice itself. In some such arrangements, the transaction circuit 210 may determine the value of the order 106 in underwriting the seller credit application (e.g., the sale price). The transaction circuit 210 may update the tag database 208 to include any information relating to the tag 204 from the seller credit application.

Where the buyer 104 is also a customer of the financial institution (e.g., where information relating to the buyer 104 is also stored in the customer database 206), the transaction circuit 210 may also use information relating to the buyer 104 in the customer database 206 to underwrite the seller credit application. The transaction circuit 210 may analyze available information relating to the buyer 104 and the order 106, for example whether the buyer 104 has sufficient funds to pay the sale price for the order 106, whether the buyer 104 has successfully performed similar transactions as the order 106, forthcoming payments and debits to accounts associated with the buyer 104, and so on.

For example, the invoice may indicate that the buyer 104 is purchasing the order 106 for $200,000, and provide a GPS transceiver identifier for the tag 204 assigned to the order 106. Using information in the customer database 206, the transaction circuit 210 may determine that the financial history of the seller 102 has been somewhat unstable, but that the buyer 104 is comparatively stable and well able to pay the $200,000 price. The transaction circuit 210 may approve the seller credit application, but only for a total value of $50,000, extended in increments as the shipment containing the order 106 approaches the buyer 104. In another similar arrangement, the transaction circuit 210 may approve the seller credit application for the full $200,000 based on the strength of the financial condition of the buyer 104.

In some arrangements, the transaction circuit 210 may store the GPS transceiver identifier (i.e., for the tag 204) and information relating to an approved line of credit for $50,000 to the seller 102 in the tag database 208, and exchange data relating to the tag 204 with the tracker computing system 212 over the network 202. The transaction circuit 210 may extend an initial $10,000 line of credit to the seller 102 when a carrier picks up the order 106 from the seller 102 (e.g., in response to a pick up confirmation provided by the seller 102 or the carrier, or an initial GPS movement detected by the tag 204). The tracker computing system 212 may subsequently receive GPS location data from the tag 204 indicating that the tag 204 is one-third of the way to the buyer 104, and transmit the GPS location data to the transaction circuit 210 (e.g., over the network 202). The transaction circuit 210 may use information in the tag database 208 to identify the tag 204 and therefore the seller 102, and increase the line of credit extended to the seller 102 to $30,000. Once the order 106 is two-thirds of the way to the buyer 104, the transaction circuit 210 may increase the line of credit to the approved $50,000.

In another arrangement, the transaction circuit 210 may be structured to increase the line of credit on a continuous basis based on distance traveled. For example, the transaction circuit 210 may be structured to increase a line of credit at a rate of $25 per mile traveled. In such an arrangement, a $50,000 line of credit may be extended to the seller 102 at the rate of $25 per mile over the course of a 2,000 mile shipment from the seller 102 to the buyer 104.

In some arrangements, the transaction circuit 210 may perform a payment transaction corresponding to the invoice price of the order 106 once the order 106 reaches the buyer 104. For example, where both the seller 102 and the buyer 104 maintains at least one respective financial account at the financial institution computing system 108, the transaction circuit 210 may access the customer database 206 to withdraw funds from an account associated with the buyer 104 and deposit those funds in another account associated with the seller 102. Where the seller 102 maintains a financial account at the financial institution computing system 108 and the buyer 104 maintains a financial account at the secondary financial institution computing system 114, the transaction circuit 210 may request and receive an invoice payment from the secondary financial institution computing system 114 over the network 202.

In addition, the transaction circuit 210 may be structured to automatically use a payment received from the buyer 104 to the seller 102 to satisfy the amount of extended credit used, if any, by the seller 102. Further, in some such arrangements, the transaction circuit 210 may be structured to close the line of credit after any amount used is repaid (e.g., where the line of credit operates as a payment advance).

As one of skill in the art would recognize, the location-based transaction system 200 may be used for other transaction types instead of or in addition to credit underwriting and credit extension. For example, payment transactions may be performed in the manner described above (with respect to the location-based transaction system 200) instead of extending an increasing line of credit. In some such arrangements, the transaction circuit 210 may be structured to debit a buyer account in the customer database 206 or at the secondary financial institution computing system 114 for each payment. In other arrangements, the transaction circuit 210 may be structured to provide the seller 102 with cash advances, which may be automatically repaid when the buyer 104 provides payment for the order 106.

As another example, the location-based transaction system 200 may be used to underwrite and provide insurance coverage based on the actual location of the order 106 at a given time. In some arrangements, the order 106 originates abroad and is shipped into the country of the buyer 104 (e.g., from China to the United States). As such, the tag 204 may be used to determine: (1) when the order 106 is being transported within China; (2) when the order 106 is being internationally transported; and (3) when the order 106 arrives in the United States. With such information received from the tag 204 (e.g., from the tracker computing system 212 over the network 202), the transaction circuit 210 may be structured to adjust insurance coverage for the order 106 based on the location of the tag 204. For example, the transaction circuit 210 may account for risks of loss incurred abroad (e.g., in China), risks involved in international transport (e.g., traveling through or near conflict regions), and risks involved in domestic processing and transport (e.g., clearing customs).

Figure 2B:
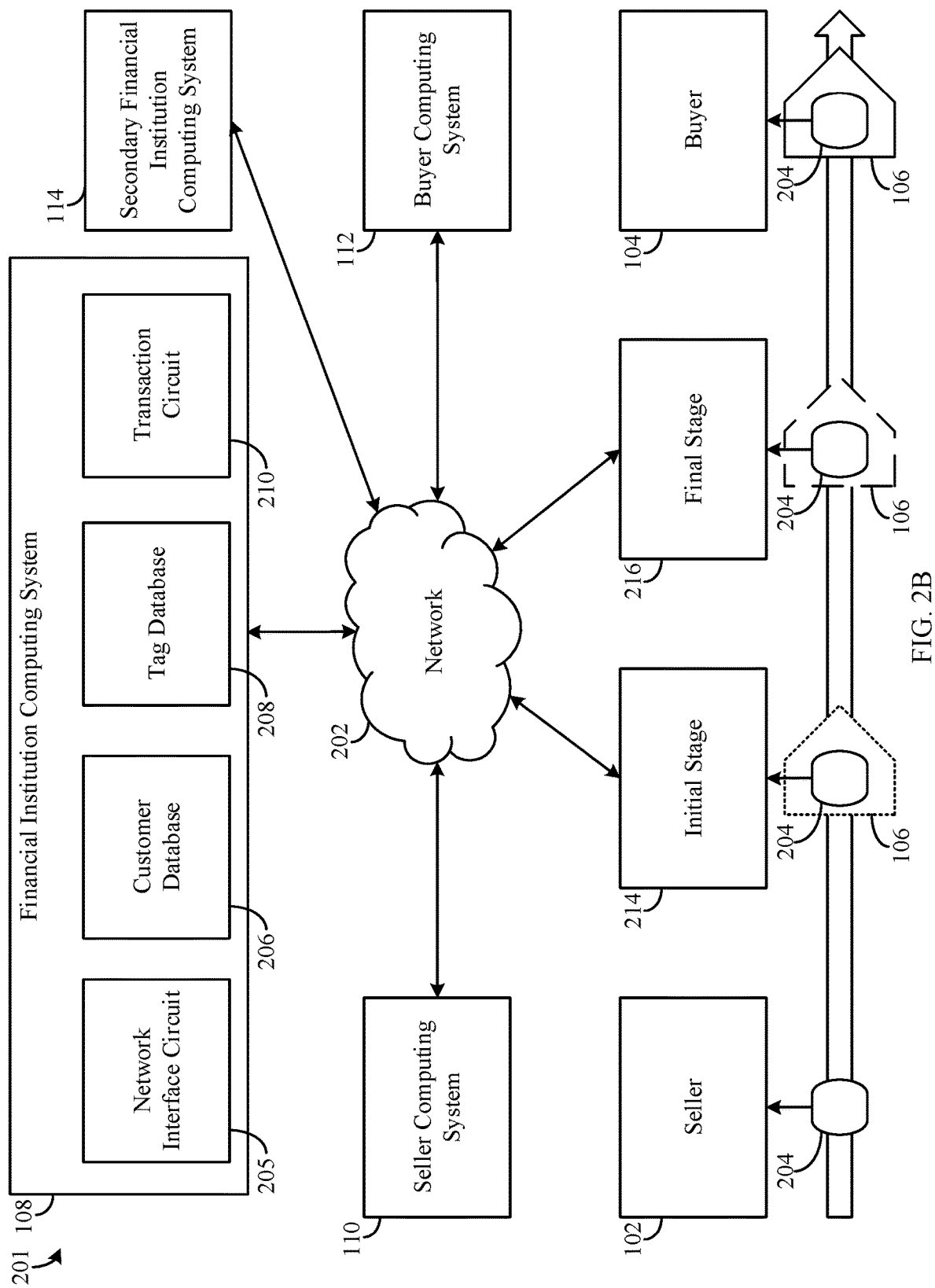

Referring now to FIG. 2B, a progress-based transaction system 201 is shown according to an example embodiment. The progress-based transaction system 201 is another example arrangement of the tracking-based transaction system 100, and similarly includes the seller 102, the buyer 104, the order 106, the financial institution computing system 108, the seller computing system 110, and the buyer computing system 112. In addition, similar to the location-based transaction system 200, the progress-based transaction system 210 includes the network 202 and the tag 204.

The progress-based transaction system 201 enables transactions at the financial institution computing system 108 that are based on the progress of the order 106 instead of or in addition to the specific location of the order 106. For example, the progress-based transaction system 201 may be implemented where goods provided by the seller 102 are manufactured, refined, developed, shipped, etc. in several stages before being sent to the buyer 104. In some arrangements, the order 106 is shipped to various different places for processing, development, or assembly. In other arrangements, the order 106 is primarily manufactured in a single location.

In various arrangements, the order 106 may take on different characteristics at each stage of preparation. The order 106 may be worth less earlier on in the preparation process (e.g., as raw materials) and worth more later on (e.g., as an interchangeable part, or a final product). The order 106 may be fragile during some stages of preparation, but reasonably secured at other stages. Further, error or accidents may occur at any time during a given preparation process, which may render some or all of the products of the order 106 unusable or unmarketable.

For example, preparation of the order 106 may include an initial stage 214 and a final stage 216 before the order 106 is received by the buyer 104. The order 106 in the initial stage 214 may be in a low value, low risk condition. For example, the order 106 may include raw materials that are processed into individual parts at the initial stage 214. The order 106 in the final stage 216 may include high value products assembled from the individual parts manufactured at the initial stage 214, which may be in a high risk condition (e.g., are fragile). In some such arrangements, the seller computing system 110 may be structured to provide information relating to the value, condition, and presence of the order 106 at each stage to the financial institution computing system 108 over the network 202.

In operation, in accordance with one arrangement, the buyer 104 may request the order 106 from the seller 102 via the buyer computing system 112 over the network 202. The seller computing system 110 may then receive the request, assign the tag 204 to the order 106, and generate an invoice for the order 106. The seller 102 may also use the seller computing system 110 to request insurance coverage for the order 106 from the financial institution computing system 108. In some arrangements, the insurance request may include information in the invoice or the invoice itself. Further, the insurance request may include information relating to the initial stage 214 and the final stage 216 of the order 106 (e.g., estimated value and condition at each stage, amount of insurance coverage at each stage, etc.).

In some arrangements, the transaction circuit 210 may receive and underwrite the insurance request based on the invoice, information relating to the initial stage 214 and the final stage 216, and the seller 102 (e.g., as stored in the customer database 206). For example, the transaction circuit 210 may not insure the order 106 until the seller computing system 110 indicates that the order 106 has reached the initial stage 214 (e.g., where raw materials are delivered to the seller 102). At which point, the transaction circuit 210 may insure the order 106 for its estimated value at the initial stage 214 and charge the seller 102 a corresponding insurance fee (e.g., debiting an account of the seller 102 in the customer database 206). In turn, the transaction circuit 210 may adjust the insurance coverage and the corresponding fee after the seller computing system 110 informs the transaction circuit 210 that the order 106 has reached the final stage 216 (e.g., has been assembled into a finished product). In some arrangements, the transaction circuit 210 will continue to insure the order 106 until the order 106 is received by the buyer 104.

The transaction circuit 210 may adjust insurance coverage and fees based on information relating to the tag 204. For example, the tag 204 may be a code that is specific to the order 106, which may be scanned or retrieved by local computing systems. As such, in some arrangements, the tag 204 is scanned or generated at the seller 102 (e.g., by the seller computing system 110) and transmitted to the transaction circuit 210 along with stage information (e.g., estimated values of the order 106 at each stage). The transaction circuit 210 may then determine that the order 106 does not yet need to be insured. When the order 106 reaches the initial stage 214, the seller computing system 110 or a related third-party computing system may subsequently provide the tag 204 as an update to the transaction circuit 210, which may then provide the seller 102 with insurance for the value of the order 106 at the initial stage 214 (e.g., raw materials or parts). The tag 204 may again be transmitted to the transaction circuit 210 at the final stage 216, and the transaction circuit 210 may provide the seller 102 with insurance for the value of the order 106 at the final stage 216 (e.g., finished products). Finally, the buyer 104 may read and transmit the tag to the transaction circuit 210 (e.g., via the buyer computing system 112), and the transaction circuit 210 may discontinue insurance coverage for the order 106.

In another arrangement involving insurance coverage, the initial stage 214 includes the generation of the invoice with respect to the order 106, and the final stage 216 includes a fully prepared order 106 to be shipped to the buyer 104. In such an arrangement, the seller computing system 110 may provide the invoice and the tag 204 to the financial institution computing system 108 at the initial stage 214, which in turn may provide insurance coverage for the order 106 over the course of manufacturing. The seller computing system 110 may subsequently transmit the tag 204 and an update that the order 106 has been fully assembled (i.e., has reached the final stage 216), at which point the financial institution computing system 108 may adjust insurance coverage to the value of the assembled order 106 during transit to the buyer 104. The financial institution computing system 108 may receive a delivery confirmation when the order 106 reaches the buyer 104, at which point the financial institution computing system 108 may discontinue insurance coverage.

In some arrangements, information relating to the condition and/or quality of the order 106 at the initial stage 214 and the final stage 216 may be provided to the financial institution computing system 108. For example, raw parts or materials received at the initial stage 214 may be analyzed to determine whether they meet minimum standards, or processed products received at the final stage 216 may be checked for damage in transit. In some arrangements, the tag 204 may be structured to detect damage to the order 106 (e.g., damage to a shipping container or product package) or to the tag 204 itself (e.g., where a carrier of the order 106 is involved in an accident and the tag 204 is damaged or destroyed). In some such arrangements, the transaction circuit 210 is structured to receive information relating to lost or damaged conditions of the order 106 or the tag 204 (e.g., via the network 202) and issue a settlement amount to the seller 102 pursuant to insurance coverage in effect at a particular stage. For example, where the tag 204 determines that the order 106 was damaged or lost at the initial stage 214, the transaction circuit 210 may issue the settlement amount for the order 106 at the initial stage 214. Accordingly, if the tag determines that the order 106 was damaged or lost at the final stage 216, the transaction circuit 210 may issue the settlement amount for the order 106 at the final stage 216.

As of one skill in the art would recognize, the arrangements discussed with respect to FIGS. 2A and 2B are but a few of many possible implementations of tracking-based transaction systems. For example, credit underwriting and extension or payments can be performed in lieu of or in addition to insurance underwriting and coverage in the progress-based transaction system 201. In addition, insurance underwriting and coverage may be performed in the location-based transaction system 200. Further still, some arrangements may include aspects of both the location-based transaction system 200 and the progress-based transaction system 201. For example, the order 106 may be tracked via both a GPS-enabled tag 204 and checkpoints at individual stages (e.g., the initial stage 214 and the final stage 216).

Figure 3:
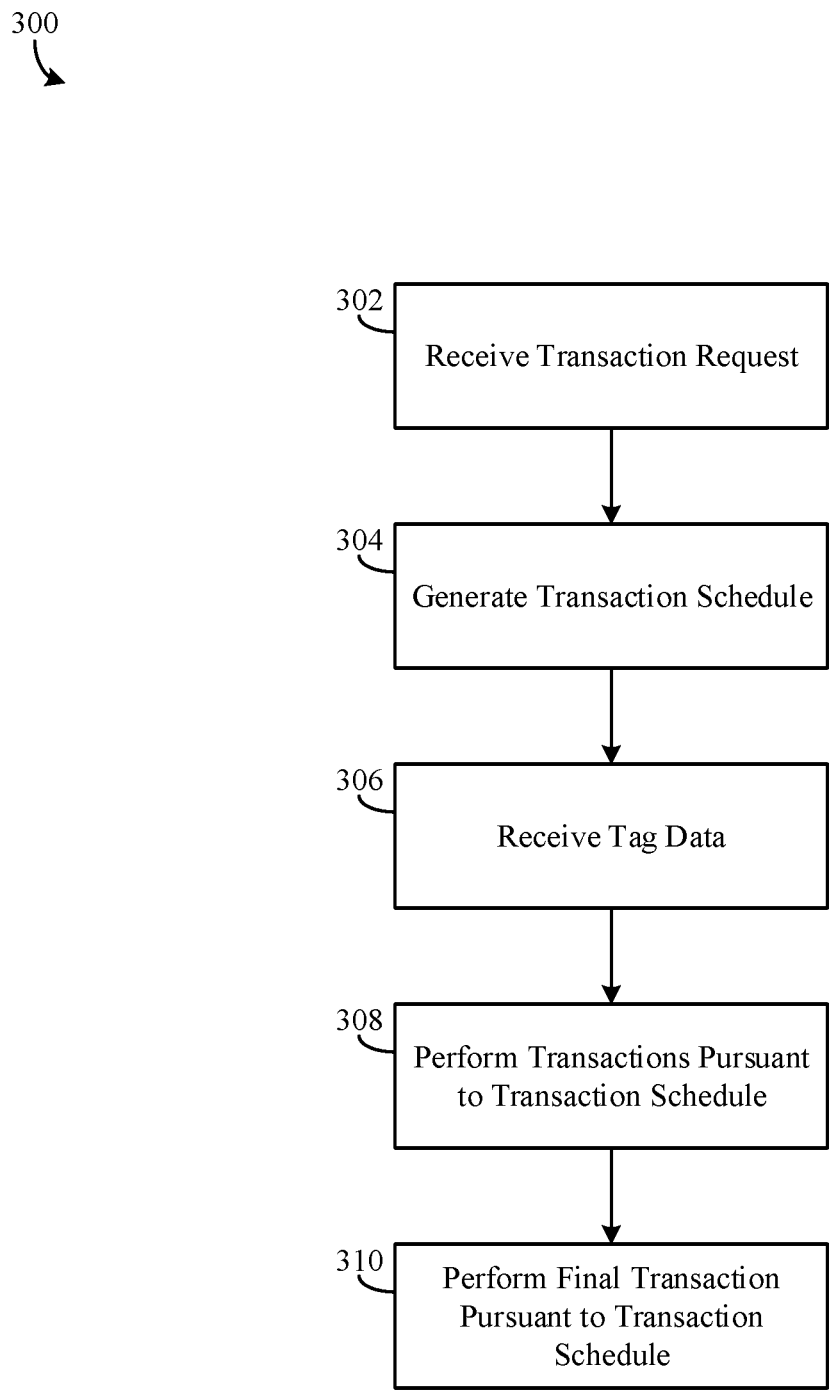
FIG. 3 is a flowchart of a method of completing tracking-based transactions, according to an example embodiment.

Referring now to FIG. 3, a method 300 of transacting with at least one party to a purchase transaction is shown. The method 300 is performed by processing and storage hardware at a financial institution computing system (e.g., financial institution computing system 108), as executed by one or more circuits structured to perform the functions described below.

At 302, a transaction request is received. A seller (e.g., the seller 102) may send the transaction request via a seller computing system (e.g., the seller computing system 110) to the financial institution computing system. A transaction circuit (e.g., the transaction circuit 210) at the financial institution computing system may receive the transaction request over a network (e.g., the network 202) via a network interface circuit (e.g., the network interface circuit 205).

The transaction request is a request on behalf of the seller to enter into some financial relationship with the financial institution, based at least in part on a purchase transaction (e.g., the order 106) between the seller and a buyer (e.g., the buyer 104). In some arrangements, the transaction request includes an application for a loan (e.g., a line of credit), a cash advance (e.g., of some or all of a sale price), and/or insurance coverage (e.g., of a shipment). The transaction request may also include information generated as part of a purchase transaction invoice (e.g., quantity, price, payment terms, etc.), or the invoice itself. Further, in some arrangements, the transaction request includes information relating to one or more tags (e.g., the tag 204).

At 304, a transaction schedule is generated. The transaction schedule determines the terms and conditions of a financial relationship between the seller and the financial institution corresponding to the transaction request. In some arrangements, the transaction schedule indicates the type and frequency of transactions to be made with respect to tag data. Tag data may include, for example, geographic location, product condition, stage information, etc. For example, the transaction schedule may determine that for a loan of $1,000,000 to the seller, $100,000 disbursements are to be made at every 10% increment of geographic progress of an order from the seller to the buyer. In some arrangements, the transaction schedule includes an underwriting process, where the transaction request received at 302 is reviewed in light of available seller, or seller and buyer financial information. The transaction schedule may be transmitted to the seller for review and approval.

In some arrangements, both the seller and the buyer are customers of the financial institution associated with the financial institution computing system. As such, the transaction schedule generated at 304 may take into account financial information relating to both the seller and the buyer. In addition, in some arrangements, the transaction schedule may include incremental payments directly from a buyer account to a seller account (i.e., instead of a line of credit or an advance provided by the financial institution). The financial institution computing system may also provide a user interface over a network for both the seller and the buyer to propose and modify various transaction terms. In some such arrangements, the user interface may provide the seller and the buyer with default or standard transaction terms, to which the seller and the buyer may accept, reject, or modify. For example, the seller may log in to the user interface, and propose a default transaction request and schedule including three payment transactions from a buyer account to a seller account. The buyer may log in to the user interface and modify the transaction request and schedule to include four payment transactions. The seller and the buyer may each approve and sign off on the modified transaction request and schedule (e.g., via an electronic signature). The financial institution computing system may then review, approve, and apply the modified transaction request and schedule.

At 306, tag data is received. Tag data may be received by the financial institution computing system over a network from a tracker computing system (e.g., the tracker computing system 212), computing systems associated with the seller (e.g., the seller computing system 110), and/or computing systems associated with one or more third parties (e.g., carriers, contractors, vendors, etc.). Tag data is collected from one or more tags (e.g., the tag 204) and provides information as to the location, stage of progress, or condition with respect to the order.

At 308, transactions pursuant to the transaction schedule are performed. The financial institution computing system performs transactions according to the transaction schedule generated at 304 in response to tag data received at 306. Transactions performed may include, for example, loan disbursements, increases in credit, payment advances, insurance coverage adjustments, and so on. In some arrangements, one or more transactions are performed in response to supplemental information in addition to tag data, for example the transaction request received at 302 (e.g., in response to receiving an invoice) or a delivery confirmation when the order reaches the buyer.

At 310, a final transaction pursuant to the transaction schedule is performed. In various arrangements, the final transaction may be triggered by a notification received at the financial institution computing system that the order has arrived at the buyer, has arrived at a specified location or milestone (e.g., has arrived at a specific receiving location, for example a domestic port), or some other event defined in the transaction schedule. The notification may be provided by the tag associated with the order, or by a computing system associated with the seller or the buyer (e.g., a delivery confirmation generated by the buyer or seller computing system, or a delivery confirmation forwarded from a carrier). In various arrangements, the final transaction may be an issuance of a final increment of credit or a cash advance, or a resolution of insurance coverage (e.g., a termination of insurance coverage). In some arrangements, the final transaction includes receiving an invoice payment from the buyer to the seller, and a satisfaction of some or all of an associated line of credit or cash advance with the invoice payment. In other arrangements, the final transaction includes a final invoice payment from the buyer to the seller where both the buyer and seller are customers of the financial institution associated with the financial institution computing system.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, the system comprising:
    a customer database configured to retrievably store customer information relating to a plurality of financial accounts;
    a tag database configured to retrievably store information relating to a plurality of tags, wherein each tag comprises a Global Positioning System ("GPS") transceiver, and wherein a tag is coupled to a good of an order of goods;
    a network interface circuit configured to facilitate the financial institution computing system in exchanging information over a network; and
    a transaction circuit, including at least one processor and a memory storing instructions executable by the processor to:

17 receive a transaction request relating to the order of goods and the tag from a seller computing system over the network;

approve the seller for a total amount of a line of credit for the order of goods;

generate a transaction schedule based on the transaction request and customer information in the customer database, and store information relating to the transaction request, the tag, and the transaction schedule in the tag database;

receive tag data corresponding to a plurality of physical movements of the good over the network, the tag data comprising GPS data, wherein each physical movement is based on a physical movement of the tag coupled to the good of the order of goods;

determine a plurality of physical locations of the good of the order of goods using the GPS data;

determine an initial line of credit that is less than the approved total amount of the line of credit based on the tag data indicating that the good of the order of goods moved a first predefined distance that is less than a total expected distance; and perform a plurality of transactions pursuant to the transaction schedule based on the determined plurality of physical locations;

wherein the performance of the plurality of transactions includes extending a line of credit to the seller in a plurality of increments relative to the total amount of the line of credit based on the determined plurality of physical locations, the plurality of increments including a first increment that increases the line of credit extended to the seller up to a first amount that is more than the initial line of credit and less than the total approved amount of the line of credit and a second increment that increases the line of credit extended to the seller up to a second amount that is more than the first amount and less than or equal to the total approved amount of the line of credit, wherein the first increment is reached in response to the tag data indicating the good of the order of goods moved a second predefined distance that is more than the first predefined distance but less than the total expected distance and the second increment is reached in response to the tag data indicating the good of the order of goods moved a third predefined distance that is more than the second predefined distance and less than or equal to the total expected distance.

2. The financial institution computing system of claim 1, wherein the at least one tag comprises a code identifying one or more goods of the order of goods.

3. The financial institution computing system of claim 1, wherein the tag data comprises information identifying a global positioning system transceiver associated with one or more goods of the order of goods.

4. The financial institution computing system of claim 1, wherein the transaction circuit receives tag data indicating that the order of goods has arrived at the buyer and receives an indication of a payment of a purchase price for the order of goods.

5. The financial institution computing system of claim 4, wherein the instructions are further executable by the processor to record an amount of the extended line of credit used by the seller;

18 wherein the performance of the plurality of transactions includes applying the payment of the purchase price toward the amount of the line of credit used by the seller.

6. The financial institution computing system of claim 1, wherein the performance of the plurality of transactions includes providing original insurance coverage for the order of goods and adjusting the original insurance coverage based on received tag data.

7. The financial institution computing system of claim 6, wherein the performance of the plurality of transactions includes performing a settlement transaction to a seller account in the customer database after the transaction circuit receives tag data indicating that the order of goods has been lost or damaged, wherein the settlement transaction corresponds to at least one of the original or adjusted insurance coverage based on previously received tag data.

8. The financial institution computing system of claim 1, wherein the performance of the plurality of transactions includes applying a plurality of payment transactions from a financial account of a buyer to a financial account of a seller toward a purchase price for the order of goods, wherein each of the plurality of payment transactions is based on received tag data.

9. The financial institution computing system of claim 1, wherein the performance of the plurality of transactions further includes applying a plurality of cash advances provided by a financial institution account to a financial account of a seller, wherein the sum of the plurality of cash advances is repaid with a payment of the purchase price for the order of goods received from a buyer.

10. The financial institution computing system of claim 1, wherein tag data is received from a tracker computing system associated with a third party.

11. The financial institution computing system of claim 1, wherein tag data is received by a tracker computing system associated with the financial institution computing system.

12. A method comprising:

receiving, by a transaction circuit of a financial institution computing system over a network through a network interface circuit, the transaction circuit including at least one processor and a memory, a transaction request relating to an order of goods and a tag from a seller computing system, wherein the tag comprises a Global Positioning System ("GPS") transceiver, and wherein the tag is coupled to a good of the order of goods;

approving, by the transaction circuit, a seller associated with the seller computing system for a total amount of a line of credit for the order of goods;

generating, by the transaction circuit, a transaction schedule based on the transaction request and customer information in a customer database at the financial institution computing system, and storing information relating to the transaction request, the tag and, and the transaction schedule in a tag database at the financial institution computing system;

receiving, by the transaction circuit, tag data over the network corresponding to a plurality of physical movements of the good, the tag data comprising GPS data, wherein each physical movement is based on a physical movement of the tag coupled to the good of the order of goods;

determining, by the transaction circuit, a plurality of physical locations of the good of the order of goods using the GPS data; and determining, by the transaction circuit, an initial line of credit that is less than the approved total amount of the line of credit based on the tag data indicating that the good of the order of goods moved a first predefined distance that is less than a total expected distance; and performing, by the transaction circuit, a plurality of transactions pursuant to the transaction schedule based on the determined plurality of physical locations;

wherein performing the plurality of transactions includes extending a line of credit to the seller in a plurality of increments relative to the total amount of the line of credit based on the determined plurality of physical locations, the plurality of increments including a first increment that increases the line of credit extended to the seller up to a first amount that is more than the initial line of credit and less than the total approved amount of the line of credit and a second increment that increases the line of credit extended to the seller up to a second amount that is more than the first amount and less than or equal to the total approved amount of the line of credit, wherein the first increment is reached in response to the tag data indicating the good of the order of goods moved a second predefined distance that is more than the first predefined distance but less than the total expected distance and the second increment is reached in response to the tag data indicating the good of the order of goods moved a third predefined distance that is more than the second predefined distance and less than or equal to the total expected distance.

13. The method of claim 12, wherein performing the plurality of transactions includes providing insurance coverage for the order of goods based on the transaction request and adjusting insurance coverage based on received tag data.

14. The method of claim 12, wherein performing the plurality of transactions includes applying a plurality of payment transactions toward a purchase price for the order of goods, wherein each of the plurality of payment transactions is based on received tag data.

15. A non-transitory computer readable media having computer-executable instructions embodied therein that, when executed by a processor of a transaction circuit of a financial institution computing system, causes the financial institution computing system to perform operations comprising:

receive a transaction request relating to an order of goods and a tag from a seller computing system over a network through a network interface circuit, wherein the tag comprises a Global Positioning System ("GPS") transceiver, and wherein the tag is coupled to a good of an order of goods;

approve a seller associated with the seller computing system for a total amount of a line of credit for the order of goods;

generate a transaction schedule based on the transaction request and customer information in a customer database at the financial institution computing system, and store information relating to the transaction request, the tag, and the transaction schedule in a tag database at the financial institution computing system;

receive tag data relating to a plurality of physical movements of the goods over the network, the tag data comprising GPS data, wherein each physical movement is based on a physical movement of the tag coupled to the good of the order of goods;

determine an initial line of credit that is less than the approved total amount of the line of credit based on the tag data indicating that the good of the order of goods moved a first predefined distance that is less than a total expected distance; and perform a plurality of transactions pursuant to the transaction schedule based on the determined plurality of physical locations;

wherein the performance of the plurality of transactions includes extending a line of credit to the seller in a plurality of increments relative to the total amount of the line of credit based on the determined plurality of physical locations, the plurality of increments including a first increment that increases the line of credit extended to the seller up to a first amount that is more than the initial line of credit and less than the total approved amount of the line of credit and a second increment that increases the line of credit extended to the seller up to a second amount that is more than the first amount and less than or equal to the total approved amount of the line of credit, wherein the first increment is reached in response to the tag data indicating the good of the order of goods moved a second predefined distance that is more than the first predefined distance but less than the total expected distance and the second increment is reached in response to the tag data indicating the good of the order of goods moved a third predefined distance that is more than the second predefined distance and less than or equal to the total expected distance.

16. The media of claim 15, wherein the performance of the plurality of transactions includes providing insurance coverage for the order of goods based on the transaction request and adjusting insurance coverage based on received tag data.

17. The media of claim 15, wherein the performance of the plurality of transactions includes applying a plurality of payment transactions toward a purchase price for the order of goods, wherein each of the plurality of payment transactions is based on received tag data.

18. A financial institution computing system, the system comprising:

a customer database configured to retrievably store information relating to a plurality of financial accounts including at least a financial account of a seller and a financial account of a buyer;

a tag database configured to retrievably store information relating to a plurality of tags associated with a plurality of orders, wherein each tag comprises a Global Positioning System ("GPS") transceiver, and wherein a tag is coupled to a good of an order of goods;

a network interface circuit configured to facilitate the financial institution computing system in exchanging information over a network; and a transaction circuit, including at least one processor and a memory storing instructions executable by the processor to:

provide a user interface for each of the seller and the buyer that is accessible over the network, wherein the user interface allows each of a seller computing system and a buyer computing system to define terms for a transaction request and a corresponding transaction schedule relating to an order of goods and the tag;

receive the terms for the transaction request and the corresponding transaction schedule from the seller computing system and the buyer computing system;

approve the seller for a total amount of a line of credit for the order of goods;

approve the transaction request and the transaction schedule based on customer information relating to each of the seller and the buyer in the customer database, and store information relating to the transaction request, the transaction schedule, at the tag in the tag database;

receive tag data corresponding to a plurality of physical movements of the good and update the user interface to allow each of the seller and the buyer to view information relating to the location of the good, the tag data comprising GPS data, wherein each physical movement is based on a physical movement of the tag coupled to the good of the order of goods;

determine a plurality of physical locations of the order of goods using the GPS data;

determine an initial line of credit that is less than the approved total amount of the line of credit based on the tag data indicating that the good of the order of goods moved a first predefined distance that is less than a total expected distance;

perform a plurality of transactions pursuant to the transaction schedule based on the determined plurality of physical locations; and wherein the performance of the plurality of transactions includes extending a line of credit to the seller in a plurality of increments relative to the total amount of the line of credit based on the determined plurality of physical locations, the plurality of increments including a first increment that increases the line of credit extended to the seller up to a first amount that is more than the initial line of credit and less than the total approved amount of the line of credit and a second increment that increases the line of credit extended to the seller up to a second amount that is more than the first amount and less than or equal to the total approved amount of the line of credit, wherein the first increment is reached in response to the tag data indicating the good of the order of goods moved a second predefined distance that is more than the first predefined distance but less than the total expected distance and the second increment is reached in response to the tag data indicating the good of the order of goods moved a third predefined distance that is more than the second predefined distance and less than or equal to the total expected distance.

19. The system of claim 18, wherein, in response to the tag data indicating that the good of the order of goods has arrived to the buyer, perform a final payment transaction to pay off at least some of an outstanding balance of the total approved amount of the line of credit.

20. The system of claim 18, wherein the plurality of transactions further includes providing insurance coverage for the order of goods and adjusting insurance coverage based on received tag data.

21. The system of claim 18, wherein the plurality of transactions further includes a plurality of payment transactions toward a purchase price for the order of goods.

* * * * *